United States Patent
Ledroz (10) Patent No.: US 12,012,847 B2
(45) Date of Patent: Jun. 18, 2024

(54) SYSTEM AND METHOD FOR USING A MAGNETOMETER IN A GYRO-WHILE-DRILLING SURVEY TOOL

(71) Applicant: Gyrodata, Incorporated, Houston, TX (US)

(72) Inventor: Adrián Guillermo Ledroz, Houston, TX (US)

(73) Assignee: GYRODATA, INCORPORATED, Houston, TX (US)

( * ) Notice: Subject to any disclaimer, the term of this patent is extended or adjusted under 35 U.S.C. 154(b) by 0 days.

(21) Appl. No.: 17/547,097

(22) Filed: Dec. 9, 2021

(65) Prior Publication Data
US 2022/0186607 A1    Jun. 16, 2022

Related U.S. Application Data (60) Provisional application No. 63/124,005, filed on Dec. 10, 2020.

(51) Int. Cl.
*E21B 47/092*    (2012.01)
*E21B 47/022*    (2012.01)
(Continued)

(52) U.S. Cl.
CPC .......... *E21B 47/092* (2020.05); *E21B 47/022* (2013.01); *E21B 47/024* (2013.01); *G01V 3/18* (2013.01); *G01V 3/40* (2013.01)

(58) Field of Classification Search
CPC .... E21B 47/092; E21B 47/022; E21B 47/024; E21B 7/04; E21B 47/0228; E21B 44/00;
(Continued)

(56) References Cited

U.S. PATENT DOCUMENTS 9,631,475 B2    4/2017    Ledroz et al.
9,863,783 B1    1/2018    Ledroz
(Continued)

FOREIGN PATENT DOCUMENTS

CN    108166971 B    12/2019

OTHER PUBLICATIONS

PCT/US2021/062821, International Search Report and Written Opinion Mar. 25, 2022, pp. 1-10.

*Primary Examiner* — Yoshihisa Ishizuka
*Assistant Examiner* — Carter W Ferrell
(74) *Attorney, Agent, or Firm* — Jeffrey D. Frantz (57) ABSTRACT

Various implementations directed to a system and method for using a magnetometer in a gyro-while-drilling (GWD) survey tool are provided. In one implementation, a method may include acquiring gyroscopic data using gyroscopic sensors of a GWD survey tool while the tool is disposed at a first position within a wellbore. The method may also include acquiring first magnetic data using a magnetometer of the GWD survey tool while the tool is disposed at the first position. The method may further include determining an offset value for the magnetometer based on the gyroscopic data and the first magnetic data. The method may additionally include acquiring second magnetic data using the magnetometer while the tool is disposed at second positions within the wellbore. The method may also include determining magnetic azimuth values for the tool disposed at the second positions based on the second magnetic data and the offset value.

20 Claims, 3 Drawing Sheets

(51) Int. Cl.
*E21B 47/024* (2006.01)
*G01V 3/18* (2006.01)
*G01V 3/40* (2006.01)

(58) Field of Classification Search
CPC .. E21B 7/06; E21B 7/10; E21B 47/00; G01V 3/18; G01V 3/40; G01V 3/04; G01V 3/22; G01V 3/26; G01C 19/38; G01C 19/02
See application file for complete search history.

(56) References Cited

U.S. PATENT DOCUMENTS

| | | |
|---|---|---|
| 10,689,969 B2 | 6/2020 | Ledroz et al. |
| 10,724,361 B2 | 7/2020 | Weston et al. |
| 10,781,691 B2 | 9/2020 | Edroz et al. |
| 2003/0236627 A1* | 12/2003 | Estes .................. E21B 47/022 702/9 |
| 2010/0187008 A1 | 7/2010 | Wassermann et al. |
| 2013/0002257 A1 | 1/2013 | McElhinney et al. |
| 2013/0211723 A1 | 5/2013 | Weston et al. |
| 2014/0374159 A1* | 12/2014 | McElhinney ......... E21B 44/005 175/45 |
| 2016/0245070 A1* | 8/2016 | VanSteenwyk .......... G01C 5/00 |
| 2018/0306025 A1 | 10/2018 | Ledroz |
| 2018/0306944 A1 | 10/2018 | Ledroz et al. |
| 2018/0363445 A1* | 12/2018 | Ledroz .................... G01V 3/26 |
| 2018/0364389 A1* | 12/2018 | Ledroz .................... G01V 3/40 |
| 2019/0128069 A1 | 5/2019 | Johnson |
| 2019/0169979 A1* | 6/2019 | Nguyen ................ E21B 47/013 |
| 2019/0330979 A1 | 10/2019 | Weston et al. |
| 2020/0132458 A1 | 4/2020 | Johnson et al. |
| 2021/0026037 A1 | 1/2021 | Weston et al. |

\* cited by examiner

SYSTEM AND METHOD FOR USING A MAGNETOMETER IN A GYRO-WHILE-DRILLING SURVEY TOOL

CROSS-REFERENCE TO RELATED APPLICATIONS

This application claims the benefit of U.S. provisional patent application Ser. No. 63/124,005, filed Dec. 10, 2020 and titled SYSTEM AND METHOD FOR DETERMINING AZIMUTH WHILE DRILLING, the entire disclosure of which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A survey tool can be equipped with survey instrumentation that is configured to provide information regarding the orientation of the survey tool and, hence, the orientation of a wellbore at the survey tool location. Survey instrumentation can make use of various measured quantities, such as one or more of acceleration, magnetic field, and angular rate, to determine the orientation of the survey tool and the associated wellbore with respect to a reference vector, such as the Earth's gravitational field, magnetic field, or rotation vector. The determination of such directional information at generally regular intervals along the path of the wellbore can be combined with measurements of wellbore depth to allow the trajectory of the wellbore to be determined.

SUMMARY

Described herein are implementations of various technologies relating to a system and method for using a magnetometer in a gyro-while-drilling survey tool. In one implementation, a method may include acquiring gyroscopic data using one or more gyroscopic sensors of a gyro-while-drilling (GWD) survey tool while the GWD survey tool is disposed at a first position within a wellbore. The method may also include acquiring first magnetic data using a magnetometer of the GWD survey tool while the GWD survey tool is disposed at the first position. The method may further include determining an offset value for the magnetometer based on the gyroscopic data and the first magnetic data. The method may additionally include acquiring second magnetic data using the magnetometer while the GWD survey tool is disposed at one or more second positions within the wellbore. The method may also include determining one or more magnetic azimuth values for the GWD survey tool disposed at the one or more second positions based on the second magnetic data and the offset value.

In another implementation, a method may include receiving gyroscopic data acquired using one or more gyroscopic sensors of a gyro-while-drilling (GWD) survey tool while the GWD survey tool is disposed at a first position within a wellbore. The method may also include receiving first magnetic data acquired using a magnetometer of the GWD survey tool while the GWD survey tool is disposed at the first position. The method may further include determining an offset value for the magnetometer based on the gyroscopic data and the first magnetic data. The method may additionally include receiving second magnetic data acquired using the magnetometer while the GWD survey tool is disposed at one or more second positions within the wellbore. The method may also include determining one or more magnetic azimuth values for the GWD survey tool disposed at the one or more second positions based on the second magnetic data and the offset value.

In yet another implementation, a system may include a gyro-while-drilling (GWD) survey tool disposed in a wellbore, the GWD survey tool including one or more gyroscopic sensors configured to acquire gyroscopic data while the GWD survey tool is disposed at a first position within the wellbore. The GWD survey tool may also include a magnetometer configured to acquire first magnetic data while the GWD survey tool is disposed at the first position and to acquire second magnetic data while the GWD survey tool is disposed at one or more second positions within the wellbore. The system may also include a computing system having a processor. The system may further include a memory having a plurality of program instructions which, when executed by the processor, cause the processor to determine an offset value for the magnetometer based on the gyroscopic data and the first magnetic data and to determine one or more magnetic azimuth values for the GWD survey tool disposed at the one or more second positions based on the second magnetic data and the offset value.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations directed to a system and method for using a magnetometer in a gyro-while-drilling survey tool will now be described in the following paragraphs with reference to FIGS. 1-3.

To obtain hydrocarbons such as oil and gas, a directional wellbore may be drilled through Earth formations along a planned trajectory (i.e., a predetermined plan for a wellbore path). While drilling, it may be important to determine a current trajectory of the wellbore for comparison against the planned trajectory of the wellbore. In particular, it may be desirable to maintain the current wellbore trajectory contained within specified limits of the planned trajectory, such as limits on inclination angle or distance from the planned trajectory.

However, portions of the wellbore path may have significant deviations from the planned trajectory, where different drilling methods may result in more deviations than others (e.g., paths that have more tortuous trajectories than others). Thus, it may be desirable to accurately determine the true path or trajectory of the wellbore. In particular, detailed data regarding the wellbore path which take account of short-term perturbations in the wellbore path may be useful for a number of reasons. Such reasons may include the identification of low-tortuosity sections for permanent installation of completion or production equipment (e.g., casing and cementing), the identification of high-tortuosity sections in which rod guide wear sleeve equipment is to be placed to increase rod and casing life and to reduce workover frequency, and so forth. Furthermore, detailed knowledge of well tortuosity may help to evaluate the drilling equipment and process (e.g., the steering while drilling performance) and for extended reach drilling.

To determine a current trajectory of a wellbore, a directional survey may be performed to determine an inclination and an azimuth along the wellbore using a survey tool. As is known in the art, the directional survey may include a gyrocompassing survey (i.e., a static survey in which measurements of the Earth's rotation rate are taken at discrete intervals on the wellbore trajectory) and/or a continuous survey (i.e., a survey in which measurements of the tool change in orientation are taken as the survey tool traverses the wellbore). Various survey tools known in the art may be used to perform the directional survey and/or other collections of measurements in conjunction with various applications, including surveys conducted during the drilling of a wellbore (e.g., measurement-while-drilling (MWD) or gyro-while-drilling (GWD) applications), post-drilling applications (e.g., wireline surveys, slickline surveys, or drop surveys), and/or any other applications known to those skilled in the art.

To perform the directional survey, the survey tool may be used within the wellbore to determine the inclination and the azimuth at various positions (e.g., one or more survey stations) along the wellbore. In particular, the survey tool may include one or more sensors configured to generate measurements corresponding to an instrument orientation with respect to one or more reference directions, the Earth's magnetic field, and/or the Earth's gravity, where the measurements may be used to determine the azimuth and the inclination along the wellbore.

For instance, the survey tool may include one or more accelerometers configured to measure one or more orthogonal components of the Earth's gravity, where the measurements may be used to determine an inclination and/or a toolface angle of the survey tool. The survey tool may also include one or more gyroscopic sensors configured to measure one or more components of the Earth's rotation rate about one or more orthogonal axes of the survey tool. In particular, the gyroscopic sensors may be configured to generate signals indicative of measurements of the rotation rate to which the gyroscopic sensors are exposed. The measurements from the gyroscopic sensors may then be used in combination with the tool inclination and the tool face angle to compute an azimuth of the survey tool and, therefore, an azimuth of the wellbore at the location of the survey tool within the wellbore. Using the inclination and the azimuth, a true path or trajectory of the wellbore may be established.

As is known in the art, it may be desirable for the survey tool to be substantially stationary with respect to the Earth while the measurements are being made by the gyroscopic sensors, such as when performing the gyrocompassing survey mentioned above. In particular, being substantially stationary may help to ensure that the gyroscopic sensors of the survey tool are subject only to the rotational motion of the Earth while these measurements are made. The failure of the survey tool to be substantially stationary may lead to inaccurate measurements by the gyroscopic sensors. As a result, an azimuth and, thus, a wellbore trajectory determined using these measurements may also be inaccurate. For example, measurements made by the gyroscopic sensors during a rotating mode of drilling may lead to errors in these measurements, such as for measurements of rotation rates in the range of hundreds of revolutions per minute (RPMs). As is known in the art, during the rotating mode of drilling, a drill string may rotate while being used to drill the wellbore, where the drill string may include the survey tool. Thus, the survey tool and its gyroscopic sensors may also rotate during the rotating mode of drilling, which may lead to inaccurate measurements by the gyroscopic sensors.

In other instances, the survey tool may include one or more magnetometers configured to measure one or more components of the Earth's magnetic field, where these measurements may be used to determine an azimuth along the wellbore. In such instances, the failure of the survey tool to be at least substantially stationary (e.g., due to residual torque trapped in a bottom hole assembly of the drill string) while these measurements are being made may have minimal effect on the accuracy of the measurements. In addition, in some instances, the survey tool may include a single-axis magnetometer configured to measure an orthogonal component of the Earth's magnetic field with respect to a z-axis of the survey tool while the survey tool rotates during drilling (e.g., during the rotating mode of drilling), where these measurements may be used to determine an azimuth along the wellbore.

However, measurements provided by a magnetometer may contain other errors that may impact the accuracy of these measurements, which may affect the accuracy of a determined azimuth and, in turn, a determined trajectory of the wellbore. In particular, the measurements provided by a magnetometer may be in error due to a variety of causes, such as biases of the magnetometer (e.g., measurement biases, scale factor errors, and/or other imperfections), magnetic interference experienced by the magnetometer (e.g., interference due to magnetic effects related to a bottom hole assembly, a chassis of the survey tool, electronics of the survey tool, a battery of the survey tool, and/or the like), and/or other causes known to those skilled in the art.

In view of the above, various implementations for a GWD survey tool using a magnetometer are described herein. In one implementation, and as further described below, the GWD survey tool disposed in a wellbore may be configured to acquire gyroscopic data and first magnetic data at a first position in the wellbore, such as during a gyrocompassing survey operation. The gyroscopic data and the first magnetic data may then be used to determine an offset value for the magnetometer. The GWD survey tool may then be configured to acquire second magnetic data. One or more magnetic azimuth values for the GWD survey tool may then be determined using the offset value and the second magnetic data. The one or more magnetic azimuth values may be used to generate a survey of the wellbore, which may be used to determine a trajectory of the wellbore.

Survey System

Figure 1:
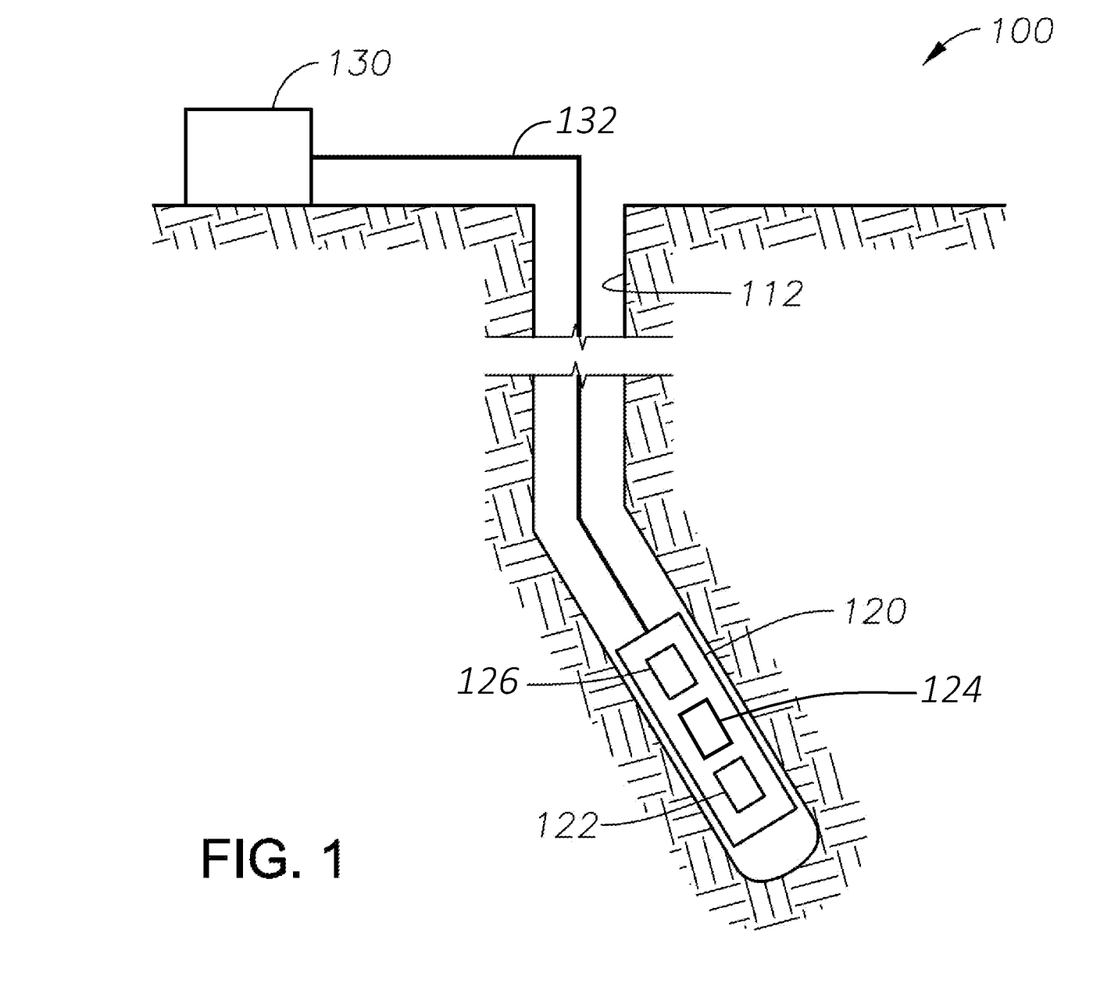
FIG. 1 illustrates a schematic diagram of a survey system in accordance with implementations of various techniques described herein.

FIG. 1 illustrates a schematic diagram of a survey system 100 in accordance with implementations of various techniques described herein. As shown, the survey system 100 may include a survey tool 120 and a computing system 130.

The survey tool 120 may be disposed within a wellbore 112 and may be used in conjunction with various applications, as further discussed herein. The survey tool 120 may be part of a downhole portion (e.g., a bottom hole assembly) of a drill string (not shown) within the wellbore 112. In one implementation, the survey tool 120 may be a GWD survey tool, where it may be part of a drill string used to drill the wellbore 112. As is known in the art, the GWD survey tool 120 may be used to perform a directional survey of the wellbore 112 while the drill string is drilling the wellbore 112 and being extended downwardly along the wellbore 112. The GWD survey tool 120 may be any survey tool known in the art that is configured to perform a directional survey for GWD applications. Though not shown, an MWD survey tool and/or other MWD instrumentation may be included as part of the GWD survey tool 120, may be included in another portion of the drill string, or both.

During the directional survey, the GWD survey tool 120 may be configured to acquire survey data during an inrun data acquisition. As is known in the art, an inrun data acquisition may refer to a data acquisition performed as a survey tool traverses downhole within a wellbore. The survey data may correspond to one or more measurements of the GWD survey tool 120 and/or the wellbore 112. To acquire the survey data, the GWD survey tool 120 may use one or more sensors disposed within the tool 120. In one implementation, the one or more sensors may include one or more gyroscopic sensors 122, one or more accelerometers 124, one or more magnetometers 126, and any other sensor known to those skilled in the art.

As described above, the one or more gyroscopic sensors 122 may be configured to measure one or more components of the Earth's rotation rate about one or more orthogonal axes (e.g., x-axis, y-axis, and/or z-axis) of the GWD survey tool 120. In particular, the one or more gyroscopic sensors 122 may be used to generate data indicative of measurements of the rotation rate to which the gyroscopic sensors 122 are exposed. Such data may hereinafter be referred to as gyroscopic data. The one or more gyroscopic sensors 122 may include one or more single-axis gyroscopic sensors, one or more multiple-axis gyroscopic sensors, or combinations thereof, where the gyroscopic sensors 122 are configured to provide measurements of the Earth's rotation rate with respect to the x-axis, the y-axis, and/or the z-axis of the GWD survey tool 120. As is known in the art, the x-axis and the y-axis may be substantially perpendicular to a longitudinal axis (i.e., the z-axis) of the GWD survey tool 120, where the x-axis and the y-axis may also be substantially perpendicular to one another. Further, the z-axis of the GWD survey tool 120 may be substantially parallel to a longitudinal axis of the wellbore 112.

The one or more gyroscopic sensors 122 may include any gyroscopic sensor known to those skilled in the art. For example, the one or more gyroscopic sensors 122 may include: one or more spinning mass gyroscopic sensors, such as a single-axis rate integrating gyroscopic sensor or a dual-axis dynamically tuned gyroscopic sensor; one or more optical gyroscopic sensors, such as a ring laser gyroscopic sensor (RLG) or a fiber-optic gyroscopic sensor (FOG); one or more Coriolis vibratory gyroscopic (CVG) sensors, such as a tuning fork gyroscopic sensor, a hemispherical resonator gyroscopic sensor (HRG), and/or a quartz CVG sensor; one or more microelectromechanical system (MEMS) gyroscopic sensors; and/or any other gyroscopic sensor known to those skilled in the art. Further, the one or more gyroscopic sensors 122 may be capable of providing measurements of the Earth's rotation rate to a desired accuracy (e.g., in a range from 0.01 degrees (°) per hour to 0.05° per hour). The one or more gyroscopic sensors 122 may also be sufficiently small to be accommodated in a downhole tool (e.g., within the confines of a 1¾ inch pressure case of a wellbore), capable of operating over an expected temperature range (e.g., −20° Celsius (C) to +150° C., or greater), and/or capable of surviving the down hole vibration and shock environment that may be encountered during the drilling process.

As similarly discussed above, the one or more accelerometers 124 may be configured to measure one or more orthogonal and/or non-orthogonal components of the Earth's gravity, where these measurements may be used to determine an inclination and/or a toolface angle of the survey tool 120, as is known to those skilled in the art. In particular, the one or more accelerometers 124 may be used to generate data indicative of these measurements of the components of the Earth's gravity, where such data may hereinafter be referred to as gravitational data. The one or more accelerometers 124 may include one or more single-axis accelerometers, one or more multiple-axis accelerometers, or combinations thereof. For example, the one or more accelerometers 124 may include three single-axis accelerometers configured to provide measurements of the orthogonal components ($g_x$, $g_y$, $g_z$) of the Earth's gravitation vector with respect to the x-axis, the y-axis, and the z-axis of the GWD survey tool 120.

The one or more accelerometers 124 may include any accelerometer known to those skilled in the art, such as one or more quartz flexure accelerometers, one or more MEMS accelerometer devices, and/or the like. Further, the measurement range of the accelerometers 124 may be in excess of ±1 unit of standard gravity (g) (e.g., in a range between ±1.2 g and ±1.5 g). In addition, the accelerometers 124 may be of a size that can be accommodated in a downhole tool (e.g., within the confines of a 1¾ inch pressure case of a wellbore), capable of operating over an expected temperature range (e.g., −20° C. to +150° C., or greater), and capable of surviving the downhole vibration and shock environment that may be encountered during the drilling process. The resolution and precision of the one or more accelerometers 124 can depend on the time and the desired angular rate uncertainty. If the time is increased, the accelerometer uncertainty can be increased as well. In some implementations, one or more of the accelerometers 124 may be included in one or more other tools of the drill string.

The one or more magnetometers 126 may be configured to measure one or more orthogonal and/or non-orthogonal components of the Earth's magnetic field, as is known to those skilled in the art. In particular, the one or more magnetometers 126 may be used to generate data indicative of measurements of a direction and a magnitude of the local magnetic field vectors, where such data may hereinafter be referred to as magnetic data. As is known in the art, the magnetic data generated by the one or magnetometers 126 may be used to generate an azimuth at various positions (e.g., survey stations) along the wellbore 112.

The one or more magnetometers 126 may include any magnetometer known to those skilled in the art, such as one or more flux gate sensors, one or more solid state devices, and/or the like. For example, the one or more magnetometers 126 may include three single-axis magnetometers configured to measure the orthogonal components ($b_x$, $b_y$, $b_z$) of the Earth's magnetic field with respect to the x-axis, the y-axis, and the z-axis of the GWD survey tool 120. A single-axis magnetometer configured to measure the orthogonal component ($b_z$) of the Earth's magnetic field with respect to the z-axis of the GWD survey tool 120 may hereinafter be referred to as a z-magnetometer.

The GWD survey tool 120 may be configured to perform any type of directional survey known to those skilled in the art, including a gyrocompassing survey. As mentioned above, the gyrocompassing survey may be a survey in which the GWD survey tool 120 acquires gyroscopic data using its one or more gyroscopic sensors 122 at discrete intervals (e.g., survey stations) along the path of the wellbore 112. During the gyrocompassing survey, the GWD survey tool 120 may also acquire gravitational data and magnetic data at these discrete intervals using the one or more accelerometers 124 and the one or more magnetometers 126, respectively.

As noted above, it may be desirable for the GWD survey tool 120 to be substantially stationary with respect to the Earth while measurements are being made by the gyroscopic sensors 122 during the gyrocompassing survey. Thus, in some instances, the GWD survey tool 120 may be configured to perform the gyrocompassing survey while a drill string section is being added to the drill string, during which time the drill string may be substantially stationary. For example, the drill string may be composed of multiple sections that are threadably coupled together. After a period of drilling the wellbore 112 using the drill string, an additional section may be added (i.e., threadably coupled) to an uphole portion of the drill string. As the section is being threadably coupled to the uphole portion of the drill string, movement of the drill string may be momentarily stabilized for a period of time, which may result in the tool 120 being disposed at a particular depth in the wellbore 112. During this period of time, the GWD survey tool 120 may be configured to start performing the gyrocompassing survey at this particular depth, such that the GWD survey tool 120 acquires, at least, gyroscopic data at this depth. After the additional section is added (e.g., threadably coupled) to the drill string, the GWD survey tool 120 may be configured to stop performing the gyrocompassing survey. The drill string may then resume drilling the wellbore 112, such that the drill string and the GWD survey tool 120 continue to be extended downwardly along the wellbore 112. The above-described process may be repeated for each subsequent section added to the drill string as it drills the wellbore 112. Accordingly, the GWD survey tool 120 may be configured to perform the gyrocompassing survey at multiple positions (e.g., survey stations) in the wellbore 112 as sections are added to the drill string, where each position may be at a different depth with respect to the other positions. As is known in the art, the GWD survey tool 120 may start or stop the performance of the gyrocompassing survey based on a mud flow within the wellbore 112 and/or the drill string, based on one or more signals from the computing system 130 and/or other components of the drill string (e.g., MWD instrumentation), and/or based on any other type of communication known to those skilled in the art.

The computing system 130 may be configured to perform a variety of functions. In particular, the computing system 130 may be configured to control and/or monitor the operation of the drill string and/or portions thereof, including the GWD survey tool 120. For example, as mentioned above, the GWD survey tool 120 may use the computing system 130 to determine whether to start or stop the performance of a directional survey (e.g., the gyrocompassing survey). In another example, after acquiring the survey data (e.g., the gyroscopic data, the gravitational data, and the magnetic data) using the GWD survey tool 120, the computing system 130 may be used to process the survey data and determine the current orientation or the trajectory of the GWD survey tool 120 within the wellbore 112, as further described herein. In a further example, the computing system 130 may also be configured to control an orientation of the one or more sensors of the tool 120.

In one implementation, the computing system 130 may be located at the surface, where the computing system 130 may be communicatively coupled to a downhole portion of the drill string (e.g., to the GWD survey tool 120) using any form of communication known to those skilled in the art. In particular, the computing system 130 may be configured to receive or download the acquired survey data and/or other data from the GWD survey tool 120 using mud pulse telemetry, electromagnetic (EM) telemetry, acoustic telemetry, and/or the like. For example, the computing system 130 may be communicatively coupled to the GWD survey tool 120 by an elongate portion 132 (e.g., a wire or cable) extending along the drill string, where the elongate portion 132 may be used to transmit the acquired survey data between the GWD survey tool 120 and the computing system 130. In a further implementation, the computing system 130 may be communicatively coupled to one or more specific components of the GWD survey tool 120, where these components of the GWD survey tool may include an on-board computing system (not shown), the one or more sensors described above, and/or the like.

In another implementation, an entirety of, or at least a portion of, the computing system 130 may be located within a downhole portion of the drill string (e.g., in the GWD survey tool 120). For example, the computing system 130 may include the on-board computing system of the GWD survey tool 120. In another example, the computing system 130 may include the on-board computing system of the GWD survey tool 120 and another computing system located on the surface. In particular, those skilled in the art will understand that, while one computing system is shown in FIG. 1, multiple computing systems may be used in the survey system 100 (e.g., in the drill string, on the surface, and/or the like) to perform one or more operations of the computing system 130 described herein.

In some implementations, the computing system 130 may be configured to receive or download the acquired survey data and/or other data from the GWD survey tool 120 in real-time or near real-time as the tool 120 traverses the wellbore 112. In such implementations, the computing system 130 may provide a real-time or near real-time processing analysis of the acquired survey data. In particular, the acquired survey data from the GWD survey tool 120 may be analyzed while the tool 120 travels within the wellbore 112. In further implementations, at least a portion of the acquired survey data may be saved in memory for analysis by the computing system 130. The computing system 130 may include sufficient data processing and data storage capacity to perform the real-time or near real-time analysis.

In other implementations, the computing system 130 may be adapted to perform a post-processing analysis of the acquired survey data. In such post-processing implementations, data may be obtained and saved from the GWD survey tool 120 as the tool 120 travels within the wellbore 112 and/or after the tool 120 has been retrieved from the wellbore 112. The saved data may be later analyzed by the computing system 130 to determine information regarding the wellbore 112. The saved data obtained from the GWD survey tool 120 may include time reference information (e.g., time tagging).

The computing system 130 can include any computing system known to those skilled in the art. Various implementations of the computing systems discussed herein, including the computing system 130, are further discussed in a later section.

Operation

As further described below, one or more elements of the survey system 100 (e.g., the GWD survey tool 120 and/or the computing system 130) may be used to perform one or more operations to determine one or more magnetic azimuths for the GWD survey tool 120 within the wellbore 112.

Initially, in one implementation, the GWD survey tool 120 may be configured to perform a gyrocompassing survey while disposed at a first position in the wellbore 112. Specifically, during the gyrocompassing survey, the GWD survey tool 120 may be configured to acquire first survey data with respect to the tool 120 while the tool 120 is disposed at the first position. In such an implementation, the GWD survey tool 120 disposed at the first position may perform the gyrocompassing survey following a period of drilling by the drill string and while a section is added (e.g., threadably coupled) to the drill string, during which time the drill string and, thus, the tool 120 may be substantially stationary. In some implementations, the computing system 130 may store the acquired first survey data in a memory and/or a storage device accessible by the computing system 130.

The first survey data may include first gyroscopic data, first gravitational data, and first magnetic data. In particular, while disposed at the first position during the gyrocompassing survey, the GWD survey tool 120 may use its one or more gyroscopic sensors 122 to acquire the first gyroscopic data with respect to the x-axis, the y-axis, and/or the z-axis of the GWD survey tool 120. In addition, the GWD survey tool 120 may use its one or more accelerometers 124 to acquire the first gravitational data with respect to the x-axis, the y-axis, and/or the z-axis of the GWD survey tool 120 while the tool 120 is disposed at the first position. Further, the GWD survey tool 120 may also use a z-magnetometer 126 to acquire the first magnetic data with respect to the z-axis of the GWD survey tool 120 while the tool 120 is disposed at the first position. In particular, the first magnetic data may include data corresponding to one or more measurements of the orthogonal component ($b_z$) of the Earth's magnetic field with respect to the z-axis of the tool 120 disposed at the first position. While the implementations below are described with respect to a z-magnetometer, those skilled in the art will understand that one or more additional magnetometers may be used, such as magnetometers used to acquire data with respect to the x-axis and/or the y-axis of the tool 120.

In addition, the first survey data acquired by the GWD survey tool 120 during the gyrocompassing survey may correspond to a depth of the GWD survey tool 120 disposed at the first position in the wellbore 112. The data that corresponds to this depth may hereinafter be referred to as first depth data. In one implementation, the depth of the GWD survey tool 120 disposed at the first position (i.e., the first depth data) can be determined based on the known length of the drill string and/or the known lengths (e.g., 30-90 feet) of each section of the drill string that has been added to the drill string. For example, if each section of the drill string is 90 feet long, then the tool 120 may acquire survey data at multiple positions along the wellbore 112 that are spaced at 90 feet from each other. Thus, the first depth data of the tool 120 may be determined based on a product of the number of sections of the drill string disposed in the wellbore 112 and a value of 90 feet. In another implementation, systems known to those skilled in the art may be used to track the depth of a drill bit coupled to the drill string. Thus, the depth (i.e., the first depth data) of the GWD survey tool 120 disposed at the first position can be determined based on the known depth of the drill bit, such as by applying an offset to the known depth of the drill bit while the tool 120 is disposed at the first position.

After acquiring the first survey data during the gyrocompassing survey, the computing system 130 may then receive and process the data. In one implementation, the computing system 130 may determine a first true azimuth value for the GWD survey tool 120 disposed at the first position based on the acquired first survey data. As is known in the art, a true azimuth value may represent a value of an angle between a vertical projection of a line of interest onto a horizontal surface and true north measured in a horizontal plane. In one such implementation, the computing system 130 may be configured to determine the first true azimuth value in real-time or near real-time, such as while the GWD survey tool 120 is still disposed at the first position.

In particular, the computing system 130 may determine this first true azimuth value based on the first gravitational data and the first gyroscopic data acquired by the GWD survey tool 120 while disposed at the first position. For example, using the first gravitational data, the computing system 130 may determine a toolface angle value and a first inclination value for the GWD survey tool 120 disposed at the first position. The computing system 130 may then determine the first true azimuth value of the tool 120 disposed at the first position using the toolface angle value, the first inclination value, and the first gyroscopic data. The toolface angle value, the first inclination value, and the first true azimuth value of the GWD survey tool 120 disposed at the first position may be determined using the following equations:

$$\alpha = \arctan\left[\frac{-g_x}{-g_y}\right] \tag{1}$$

$$I_1 = \arctan\left[\frac{\sqrt{g_x^2 + g_y^2}}{g_z}\right] \tag{2}$$

$$A = \arctan\left[\frac{\omega_x \cos\alpha - \omega_y \sin\alpha}{(\omega_x \sin\alpha + \omega_y \cos\alpha)\cos I_1 + \omega_z \sin I_1}\right] \tag{3}$$

where $\alpha$ represents the toolface angle value of the GWD survey tool 120 disposed at the first position; $I_1$ represents the first inclination value of the GWD survey tool 120 disposed at the first position; A represents the first true azimuth value of the GWD survey tool 120 disposed at the first position; $g_x$, $g_y$, and $g_z$ represent measurements (i.e., from the first gravitational data) of the Earth's gravitation vector with respect to the x-axis, the y-axis, and the z-axis, respectively, of the GWD survey tool 120 disposed at the first position; and $\omega_x$, $\omega_y$, and $\omega_z$ represent measurements (i.e., from the first gyroscopic data) of the Earth's rotation rate with respect to the x-axis, the y-axis, and the z-axis, respectively, of the GWD survey tool 120 disposed at the first position.

The computing system 130 may also receive a magnetic declination value for the GWD survey tool 120. As is known in the art, a magnetic declination value represents a value of the angle on the horizontal plane between magnetic north and true north, where the angle may vary based on a geographical location on the Earth's surface. The computing system 130 may receive the magnetic declination value using any technique known in the art. In one implementation, the magnetic declination value for the GWD survey tool 120 may be a known quantity for the particular geographical location at which the tool 120 is located. In such an implementation, the magnetic declination value may be obtained from one or more sources that are separate from and/or independent of the survey system 100. For example, the computing system 130 may obtain the magnetic declination value for the GWD survey tool 120 using one or more sources that include a satellite navigation system (e.g., a global positioning system), one or more maps (e.g., topographic maps of the U.S. Geological Survey), one or more models (e.g., models of the National Geophysical Data Center), and/or the like. In a further implementation, the magnetic declination value and/or the sources may be stored in a memory and/or a storage device accessible by the computing system 130, such that the magnetic declination value and/or the sources can be retrieved by the computing system 130.

Using the first true azimuth value and the magnetic declination value, the computing system 130 may then determine a first magnetic azimuth value of the GWD survey tool 120 disposed at the first position during the gyrocompassing survey. As is known in the art, a magnetic azimuth value may represent a value of an angle between a vertical projection of a line of interest onto a horizontal surface and magnetic north measured in a horizontal plane. The computing system 130 may determine the first magnetic azimuth value using any technique known in the art. In one implementation, the computing system 130 may determine the first magnetic azimuth value based on the first gyroscopic data and the first gravitational data. For example, the computing system 130 may determine the first magnetic azimuth value based on the first true azimuth value determined as described above (i.e., using the first gyroscopic data and the first gravitational data) and the magnetic declination value. In a further implementation, the computing system 130 may be configured to determine the first magnetic azimuth value in real-time or near real-time, such as while the GWD survey tool 120 is still disposed at the first position.

The computing system 130 may further receive a total magnetic field value for the GWD survey tool 120. As is known in the art, a total magnetic field value may represent a value of the strength of the Earth's magnetic field at a particular geographical location. The computing system 130 may receive the total magnetic field value using any technique known in the art. In one implementation, the computing system 130 may determine the total magnetic field value based on the first magnetic data, where the first magnetic data may further include data indicative of measurements of the orthogonal components ($b_x$, $b_y$, $b_z$) of the Earth's magnetic field with respect to the x-axis, the y-axis, and the z-axis of the GWD survey tool 120. In another implementation, the total magnetic field value for the GWD survey tool 120 may be a known quantity for the particular geographical location at which the tool 120 is located. In such an implementation, the total magnetic field value may be obtained from one or more sources that are separate from and/or independent of the survey system 100. For example, the computing system 130 may obtain the total magnetic field value for the GWD survey tool 120 using one or more sources that include a satellite navigation system (e.g., a global positioning system), one or more models (e.g., the International Geomagnetic Reference Field, the World Magnetic Model, and/or the Enhanced Magnetic Model), and/or the like. In a further implementation, the total magnetic field value and/or the sources may be stored in a memory and/or a storage device accessible by the computing system 130, such that the total magnetic field value and/or the sources can be retrieved by the computing system 130.

The computing system 130 may also receive a magnetic dip angle value for the GWD survey tool 120. As is known in the art, a magnetic dip angle value may represent a value of an angle made with the horizontal plane by the Earth's magnetic field lines, where the angle may vary based on a geographical location on the Earth's surface. The computing system 130 may receive the magnetic dip angle value using any technique known in the art. In one implementation, the magnetic dip angle value for the GWD survey tool 120 may be a known quantity for the particular geographical location at which the tool 120 is located. In such an implementation, the magnetic dip angle may be obtained from one or more sources that are separate from and/or independent of from the survey system 100. For example, the computing system 130 may obtain the magnetic dip angle value for the GWD survey tool 120 using one or more sources that include a satellite navigation system (e.g., a global positioning system), one or more models (e.g., the International Geomagnetic Reference Field, the World Magnetic Model, and/or the Enhanced Magnetic Model), and/or the like. In a further implementation, the magnetic dip angle value and/or the sources may be stored in a memory and/or a storage device accessible by the computing system 130, such that the magnetic dip angle value and/or the sources can be retrieved by the computing system 130.

Using the first magnetic azimuth value, the total magnetic field value, and the magnetic dip angle value, the computing system 130 may then determine an offset value for the z-magnetometer 126 of the GWD survey tool 120. The offset value may represent a summation of one or more causes of errors in the measurements provided by the z-magnetometer 126. As mentioned above, the one or more causes of errors may include biases of the z-magnetometer 126 (e.g., measurement biases, scale factor errors, and/or other imperfections), magnetic interference experienced by the z-magnetometer 126 (e.g., interference due to magnetic effects related to the bottom hole assembly of the drill string, a chassis of the tool 120, electronics of the tool 120, a battery of the tool 120, and/or the like), and/or other causes known to those skilled in the art. Thus, in some implementations, the offset value may be relatively constant over time, as the causes of errors may also be relatively constant.

In one implementation, the computing system 130 may determine the offset value for the z-magnetometer 126 based on the first magnetic data and the first gyroscopic data. For example, the computing system 130 may determine the offset value for the z-magnetometer 126 based on the first magnetic data, the first magnetic azimuth value determined as described above (i.e., using the first gyroscopic data), the total magnetic field value, the magnetic dip angle value, and the first inclination value. In particular, the offset value for the z-magnetometer 126 may be determined using the following equation:

$$Bz_{offset} = Bz_1 - Bt^*(\cos\theta \cos A_{m1} \sin I_1 + \sin\theta \cos I_1) \quad (4)$$

where $Bz_{offset}$ represents the offset value for the z-magnetometer 126; $Bz_1$ represents a measurement (i.e., from the first magnetic data) by the z-magnetometer 126 of the Earth's magnetic field with respect to the z-axis of the GWD survey tool 120 disposed at the first position; Bt represents the total magnetic field value for the GWD survey tool 120 at its geographical location; θ represents the magnetic dip angle value for the GWD survey tool 120 at its geographical location; $A_{m1}$ represents the first magnetic azimuth value of the GWD survey tool 120 disposed at the first position; $I_1$ and represents the first inclination value of the GWD survey tool 120 disposed at the first position. Those skilled in the art will understand that offset values for other magnetometers may be similarly determined using one or more equations that are comparable to Equation 4.

In a further implementation, the first gyroscopic data, the first gravitational data, and/or the first magnetic data may each correspond to multiple measurements acquired by the GWD survey tool 120 at the first position. In such an implementation, the computing system 130 may calculate an average of these multiple measurements, and then use this average when determining the offset value as described above. In some implementations, the computing system 130 may be configured to determine the one or more offset values in real-time or near real-time, such as while the GWD survey tool 120 is disposed at, or proximate to, the first position. In other implementations, the one or more offset values may be stored in a memory and/or a storage device accessible by the computing system 130, such that the one or more offset values can be retrieved by the computing system 130.

As noted above, after the period of time during which the GWD survey tool 120 performs the gyrocompassing survey, the drill string may resume drilling the wellbore 112. For example, the drill string may resume drilling the wellbore 112 after an additional section has been added to the drill string. Once drilling resumes, the drill string may continue to be extended downwardly along the wellbore 112, such that the GWD survey tool 120 may traverse in a downhole direction from the first position within the wellbore 112.

In one implementation, as the GWD survey tool 120 travels in the downhole direction from the first position while the wellbore 112 is being drilled again, the tool 120 may be configured to perform another directional survey of the wellbore 112 at one or more second positions (e.g., one or more survey stations) within the wellbore 112. In particular, during this directional survey, the GWD survey tool 120 may be configured to acquire second survey data at the one or more second positions in the wellbore 112. In some implementations, the computing system 130 may store the acquired second survey data in a memory and/or a storage device accessible by the computing system 130. In another implementation, the GWD survey tool 120 may begin or stop the acquisition of the second survey data based on one or more signals from the computing system 130 and/or other components of the drill string (e.g., MWD instrumentation), and/or based on any other type of communication known to those skilled in the art.

The second survey data may include, at least, second gravitational data and second magnetic data. In particular, the GWD survey tool 120 may use its one or more accelerometers 124 to acquire the second gravitational data with respect to the x-axis, the y-axis, and/or the z-axis of the GWD survey tool 120 while the tool 120 is at the one or more second positions. In addition, the GWD survey tool 120 may also use its z-magnetometer 126 to acquire the second magnetic data with respect to the z-axis of the GWD survey tool 120 while the tool 120 is at the one or more second positions. In particular, the second magnetic data may include data corresponding to one or more measurements of the orthogonal component ($b_z$) of the Earth's magnetic field with respect to the z-axis of the GWD survey tool 120 disposed at the one or more second positions.

The one or more second positions (e.g., one or more survey stations) may correspond to one or more positions in the wellbore 112 at which the GWD survey tool 120 is disposed while acquiring the second survey data. In particular, as the GWD survey tool 120 travels in the downhole direction from the first position while the wellbore 112 is being drilled again, the GWD survey tool 120 may be configured to acquire the second survey data at the one or more second positions. Thus, the one or more second positions may be downhole from the first position within the wellbore 112, such that the one or more second positions are located at greater depths within the wellbore 112 relative to the first position. In addition, each of the second positions may be located at a different depth with respect to the other second positions.

In one implementation, the GWD survey tool 120 may be configured to acquire the second survey data at specified time intervals. In such an implementation, the relative distances between the second positions (e.g., the survey stations) at which the second survey data is acquired may depend on a rate of penetration (ROP) of the drill string within the wellbore 112. In particular, an increased ROP may lead to an increased rate of descent of the GWD survey tool 120 within the wellbore 112, thereby leading to greater relative distances (e.g., five meters) between the second positions at which the second survey data is acquired. In turn, this acquired second survey data may be of a relatively lower resolution. Conversely, a decreased ROP may lead to a decreased rate of descent of the GWD survey tool 120 within the wellbore 112, thereby leading to lower relative distances (e.g., 0.5 meters) between the second positions at which the second survey data is acquired. In turn, this acquired second survey data may be of a relatively higher resolution. In some implementations, the computing system 130 may be configured to set the specified time intervals for the GWD survey tool 120. In further implementations, the relative distances between the second positions may be less than the relative distances between the positions at which the GWD survey tool 120 performs its gyrocompassing survey. For example, the relative distances between the second positions may be equal to about 3 feet, whereas the relative distances between the positions at which the GWD survey tool 120 performs its gyrocompassing survey may be equal to about 90 feet.

The computing system 130 may then receive and process the second survey data that was acquired by the GWD survey tool 120 while disposed at the one or more second positions. In one implementation, using the acquired second gravitational data, the computing system 130 may determine one or more second inclination values for the GWD survey tool 120 disposed at the one or more second positions. For example, using Equation 2 from above, the computing system 130 may determine a second inclination value for a particular second position in the wellbore 112 based on the second gravitational data acquired at that position. In such an example, the computing system 130 may determine a second inclination value for each of the second positions in the wellbore 112.

Further, after determining the one or more second inclination values, the computing system 130 may determine one or more second magnetic azimuth values for the GWD survey tool 120 disposed at the one or more second positions. In some implementations, the computing system 130 may determine the one or more second magnetic azimuth values in real-time or near real-time, such as while the GWD survey tool 120 is disposed at, or proximate to, the one or more second positions. In other implementations, the one or more second magnetic azimuth values may be stored in a memory and/or a storage device accessible by the computing system 130, such that the one or more second magnetic azimuth values can be retrieved by the computing system 130.

In particular, the computing system 130 may determine the one or more second magnetic azimuth values based on the determined offset value and the second magnetic data acquired by the GWD survey tool 120 while disposed at the one or more second positions. For example, the computing system 130 may determine a second magnetic azimuth value for the tool 120 while disposed at a particular second position in the wellbore 112 based on the second magnetic data acquired at that position, the offset value, the total magnetic field value, the magnetic dip angle value, and the second inclination value determined for that position. In such an example, the second magnetic azimuth value of the tool 120 at this particular second position in the wellbore 112 may be determined using the following equation:

$$A_{m2} = \cos^{-1}\left(\frac{Bz_2 - Bz_{offset} - Bt\sin\theta\cos I_2}{Bt\cos\theta\sin I_2}\right) \quad (5)$$

where $A_{m2}$ represents the second magnetic azimuth value of the GWD survey tool 120 disposed at the particular second position; $Bz_2$ represents a measurement (i.e., from the second magnetic data) by the z-magnetometer 126 of the Earth's magnetic field with respect to the z-axis of the GWD survey tool 120 disposed at the particular second position; and $I_2$ represents the second inclination value of the GWD survey tool 120 disposed at the particular second position. The computing system 130 may similarly determine a second magnetic azimuth values for each of the second positions in the wellbore 112.

In a further implementation, the second gravitational data and/or the second magnetic data acquired by the GWD survey tool 120 at a particular second position may each correspond to multiple measurements at that second position. In such an implementation, the computing system 130 may calculate an average of the multiple measurements, and then use this average when determining the second magnetic azimuth value of the tool 120 at this second position. In addition, those skilled in the art will understand that other magnetic azimuth values may be determined using offset values for other magnetometers, such as through the use of equations that are comparable to Equation 5.

By using the offset value and the second magnetic data as described above, the computing system 130 may be able to determine the one or more second magnetic azimuth values more accurately. Based on the second magnetic azimuth values, the computing system 130 may be able to generate a more accurate survey of the wellbore 112, thereby providing more accurate information regarding the trajectory and, therefore, the tortuosity of the wellbore 112.

In one implementation, the computing system 130 may generate the survey by plotting the second magnetic azimuth values and the second inclination values versus the one or more depths of the GWD survey tool 120 disposed at the one or more second positions in the wellbore 112. The depths of the GWD survey tool 120 disposed at the second positions may be determined using any techniques known in the art, including determining these depths based on the driller's depth and/or a pipe tally. The data corresponding to these depths may be hereinafter referred to as second depth data. In one example, the on-board computing system of the GWD survey tool 120 may generate the survey in real-time or near real-time, such as during a drilling of the wellbore 112 and while the tool 120 is disposed at, or proximate to, the one or more second positions. In another example, the on-board computing system of the GWD survey tool 120 may transmit the second magnetic azimuth values and the second inclination values in real-time or near real-time to a computing system positioned on the surface, where the computing system on the surface may use these values to generate the survey of the wellbore in real-time or near real-time.

In another implementation, the computing system 130 may determine one or more second true azimuth values based on the magnetic declination value and the one or more second magnetic azimuth values. In turn, the computing system 130 may generate the survey by plotting the second true azimuth values and the second inclination values versus the one or more depths of the GWD survey tool 120 disposed at the one or more second positions in the wellbore 112. In one example, the on-board computing system of the GWD survey tool 120 may generate the survey in real-time or near real-time, such as during a drilling of the wellbore 112 and while the tool 120 is disposed at, or proximate to, the one or more second positions. In another example, the on-board computing system of the GWD survey tool 120 may transmit the second magnetic azimuth values, the second inclination values, and/or the second true azimuth values in real-time or near real-time to a computing system positioned on the surface, where the computing system on the surface may use these values to generate the survey of the wellbore in real-time or near real-time.

Figure 2:
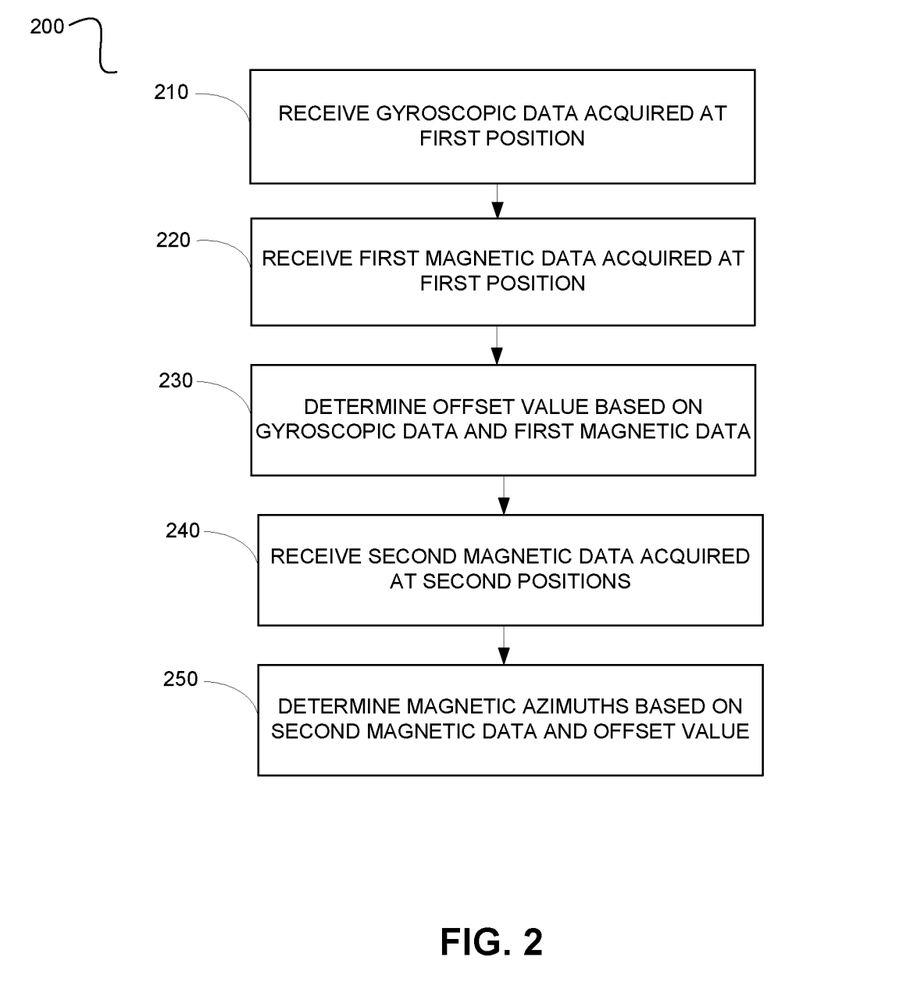
FIG. 2 illustrates a flow diagram of a method for determining one or more magnetic azimuths for a gyro-while-drilling survey tool disposed within a wellbore in accordance with implementations of various techniques described herein.

FIG. 2 illustrates a flow diagram of a method 200 for determining one or more magnetic azimuths for a GWD survey tool disposed within a wellbore in accordance with implementations of various techniques described herein. In one implementation, method 200 may be at least partially performed by one or more computing systems, such as the computing system 130 discussed above. It should be understood that while method 200 indicates a particular order of execution of operations, in some implementations, certain portions of the operations might be executed in a different order. Further, in some implementations, additional operations or steps may be added to the method 200. Likewise, some operations or steps may be omitted.

At block 210, the computing system may receive gyroscopic data acquired using one or more gyroscopic sensors of the GWD survey tool disposed at a first position within the wellbore. As noted above, the GWD survey tool may be configured to perform a gyrocompassing survey while disposed at the first position in the wellbore. During the gyrocompassing survey, the GWD survey tool may acquire the gyroscopic data. In one implementation, the GWD survey tool disposed at the first position may perform the gyrocompassing survey following a period of drilling by a drill string and while a section is added to the drill string, during which time the drill string and, thus, the GWD survey tool may be substantially stationary.

At block 220, the computing system may receive first magnetic data acquired using a z-magnetometer of the GWD survey tool disposed at the first position within the wellbore. In particular, the GWD survey tool may be configured to acquire the first magnetic data during the gyrocompassing survey while disposed at the first position. The first magnetic data may include data corresponding to one or more measurements of the orthogonal component ($b_z$) of the Earth's magnetic field with respect to the z-axis of the tool disposed at the first position.

In addition, the GWD survey tool may be configured to acquire first gravitational data using its one or more accelerometers during the gyrocompassing survey while disposed at the first position. In some implementations, the computing system may receive the gyroscopic data, the first magnetic data, and/or the first gravitational data from the GWD survey tool 120 in real-time or near real-time, such as while the tool is still disposed at the first position.

At block 230, the computing system may determine an offset value for the z-magnetometer based on the gyroscopic data and the first magnetic data. In one implementation, the computing system may use the gyroscopic data and the first gravitational data to determine a first inclination value and a first true azimuth value for the GWD survey tool 120 disposed at the first position. For example, the computing system may use Equations 2 and 3, as shown above, to determine the first inclination value and the first true azimuth value. Further, using the first true azimuth value and a magnetic declination value for the tool, the computing system may determine a first magnetic azimuth value for the GWD survey tool 120 disposed at the first position.

The computing system may then determine the offset value for the z-magnetometer based on the first magnetic azimuth value, the first magnetic data, the total magnetic field value for the tool, the magnetic dip angle value for the tool, and the first inclination value. For example, the computing system may use Equation 4, as shown above, to determine the offset value for the z-magnetometer.

At block 240, the computing system may receive second magnetic data acquired using the z-magnetometer of the GWD survey tool disposed at one or more second positions within the wellbore. As noted above, after the period of time during which the GWD survey tool performs the gyrocompassing survey, the drill string may resume drilling the wellbore. In one implementation, as the GWD survey tool travels in the downhole direction from the first position while the wellbore is being drilled again, the tool may be configured to acquire the second magnetic data at the one or more second positions. The one or more second positions may be downhole from the first position within the wellbore, such that the one or more second positions are located at greater depths within the wellbore relative to the first position. In addition, each of the second positions may be located at a different depth with respect to the other second positions.

In addition, the GWD survey tool may be configured to acquire second gravitational data using its one or more accelerometers while disposed at the one or more second positions within the wellbore. In some implementations, the computing system may receive the second magnetic data and/or the second gravitational data from the GWD survey tool 120 in real-time or near real-time, such as while the tool is still disposed at the one or more second positions.

At block 250, the computing system may determine one or more magnetic azimuths for the GWD survey tool disposed at the one or more second positions based on the second magnetic data and the offset value. In one implementation, the computing system may determine one or more second magnetic azimuth values for the GWD survey tool disposed at the one or more second positions based on the second magnetic data, the offset value, a second inclination angle determined using the second gravitational data, the total magnetic field value for the tool, and the magnetic dip angle value for the tool. For example, the computing system may use Equation 5, as shown above, to determine the one or more second magnetic azimuths for the GWD survey tool disposed at the one or more second positions. In some implementations, the computing system may be configured to determine the one or more second magnetic azimuth values in real-time or near real-time.

In view of the above, various implementations for a system and method for using a magnetometer in a GWD survey tool are disclosed herein. In some implementations, a computing system of a survey system (e.g., the survey system 100) may compensate for errors associated with a z-magnetometer when determining magnetic azimuth values for a GWD survey tool disposed in a wellbore. In particular, the computing system may compensate for the errors by determining an offset value for the z-magnetometer based on gyroscopic data and first magnetic data from the z-magnetometer. The computing system may then determine the magnetic azimuth values using the offset value and second magnetic data from the z-magnetometer. These magnetic azimuth values may be more accurate when compared to magnetic azimuth values determined without the use of an offset value. As a result, based on the magnetic azimuth values determined using the offset value and second magnetic data, the computing system may generate a more accurate survey of the wellbore. Accordingly, the computing system may be able to provide more accurate information regarding the trajectory and, in turn, the tortuosity of the wellbore.

Additionally, the GWD survey tool (e.g., the tool 120) of the survey system may be able to acquire accurate survey data (e.g., the second magnetic data) more frequently than survey tools acquiring gyroscopic data, such as those survey tools performing a gyrocompassing survey. In particular, as noted above, the failure of a survey tool to be substantially stationary while acquiring gyroscopic data may lead to inaccurate gyroscopic data, which may result in inaccurate azimuths and surveys of the wellbore. Thus, in some instances, this survey tool may acquire the gyroscopic data only while a drill string section is being added to the drill string (e.g., every 90 feet), during which time the drill string may be substantially stationary. In contrast, the failure of the GWD survey tool of the implementations disclosed herein to be substantially stationary may have minimal effect on the accuracy of the second magnetic data acquired via the z-magnetometer. As a result, the GWD survey tool may be able to acquire the second magnetic data more frequently than the survey tool acquiring gyroscopic data for a gyrocompassing survey. For example, the GWD survey tool of the implementations disclosed herein may acquire the second magnetic data every 1-20 feet within the wellbore. In another example, the GWD survey tool may be able to acquire the second magnetic data while the wellbore is being drilled, which stands in contrast with a survey tool acquiring gyroscopic data, such as during the gyrocompassing survey. In particular, the GWD survey tool may be able to acquire the second magnetic data during the rotating mode of drilling (as described above), a sliding mode of drilling, or both. As is known in the art, during the sliding mode of drilling, a drill string (which may include the GWD survey tool) may not rotate as a downhole bit turns via a downhole motor, such that the wellbore is drilled in a direction at which the bit is pointing.

In turn, by acquiring the second magnetic data more frequently than the survey tool acquiring gyroscopic data, the computing system may be able to determine more frequent magnetic azimuth values for the wellbore. As a result, the computing system may be able to generate a higher resolution survey of the wellbore when compared to surveys generated using gyroscopic data. Thus, the computing system may be able to provide more frequent information regarding the trajectory and, in turn, the tortuosity of the wellbore. In particular, frequent information regarding the trajectory of the wellbore may be useful for wellbores containing severe high dog-legs and/or sections of high tortuosity, where failure to capture such details of trajectory can lead to errors in knowledge of well locations. In addition, an accurate determination of the trajectory of the wellbore can be used in the identification of low-tortuosity sections for permanent installation of completion or production equipment (e.g., casing and cementing), the identification of high-tortuosity sections in which rod guide wear sleeve equipment is to be placed to increase rod and casing life and to reduce workover frequency, and/or the like.

Furthermore, accurate information regarding the wellbore tortuosity may help to evaluate the drilling equipment and process (e.g., the steering while drilling performance) and for extended reach drilling. For example, the tortuosity information can be helpful in determining where to place one or more pumps in the wellbore. The placement of a pump in a wellbore section having a relatively high tortuosity can reduce the lifetime of the pump dramatically. If installed in a higher-tortuosity section of the wellbore, the pump may be subject to a bending moment due to the shape of the wellbore restricting the ability of the pump rotor to turn freely (e.g., as a result of excess pressure on the bearings or sliding contact between the rotor and the outer casing of the pump), causing the pump to wear out sooner than had the pump been installed in a lower-tortuosity section of the wellbore.

In addition, based on the more accurate information regarding the trajectory and the tortuosity of the wellbore provided by the survey system, as described above, one or more operations relating to the drilling of the wellbore may be performed. In one implementation, these operations may include the steering of the drill string and/or other drilling equipment within the wellbore. For example, based on the more accurate information regarding the trajectory and the tortuosity of the wellbore, a computing system may be configured to change or maintain a current wellbore trajectory in accordance with a preprogrammed trajectory or directional commands, such that the steering of the drill string may be changed or maintained. In some implementations, the steering of the drill string and/or other drilling equipment within the wellbore may improve based on the use of the offset value and the acquisition of magnetic data using magnetometers of the GWD survey tool, which may be proximate to the drill bit.

In another implementation, the computing system may receive the second magnetic data in real-time or near real-time, such that the computing system may be able to determine the magnetic azimuth values and/or the survey of the wellbore in real-time or near real-time. In such an implementation, the computing system may be able to generate the survey of the wellbore the survey without needing to perform a post-processing analysis of the second magnetic data. Thus, fewer people may be needed on a rig platform to assist with retrieving the GWD survey tool from the wellbore, to assist with obtaining the second magnetic data from the GWD survey tool, or both. With fewer people needed on the right platform, safety risks and/or expenses related to the wellbore drilling may be minimized. For example, as mentioned above, the on-board computing system of the GWD survey tool may transmit the second magnetic azimuth values in real-time or near real-time (e.g., via mud pulse telemetry, EM telemetry, acoustic telemetry, and/or the like) to a computing system positioned on the surface, where the computing system on the surface may generate the survey of the wellbore in real-time or near real-time.

Further, the one or more magnetometers of the GWD survey tool can be used to detect nearby casing, where such casings may not be detected by gyroscopic data alone. The detection of these casings may be useful for scenarios in which unreported wells or casings are nearby and/or in the way of a planned wellbore.

Computing System

Figure 3:
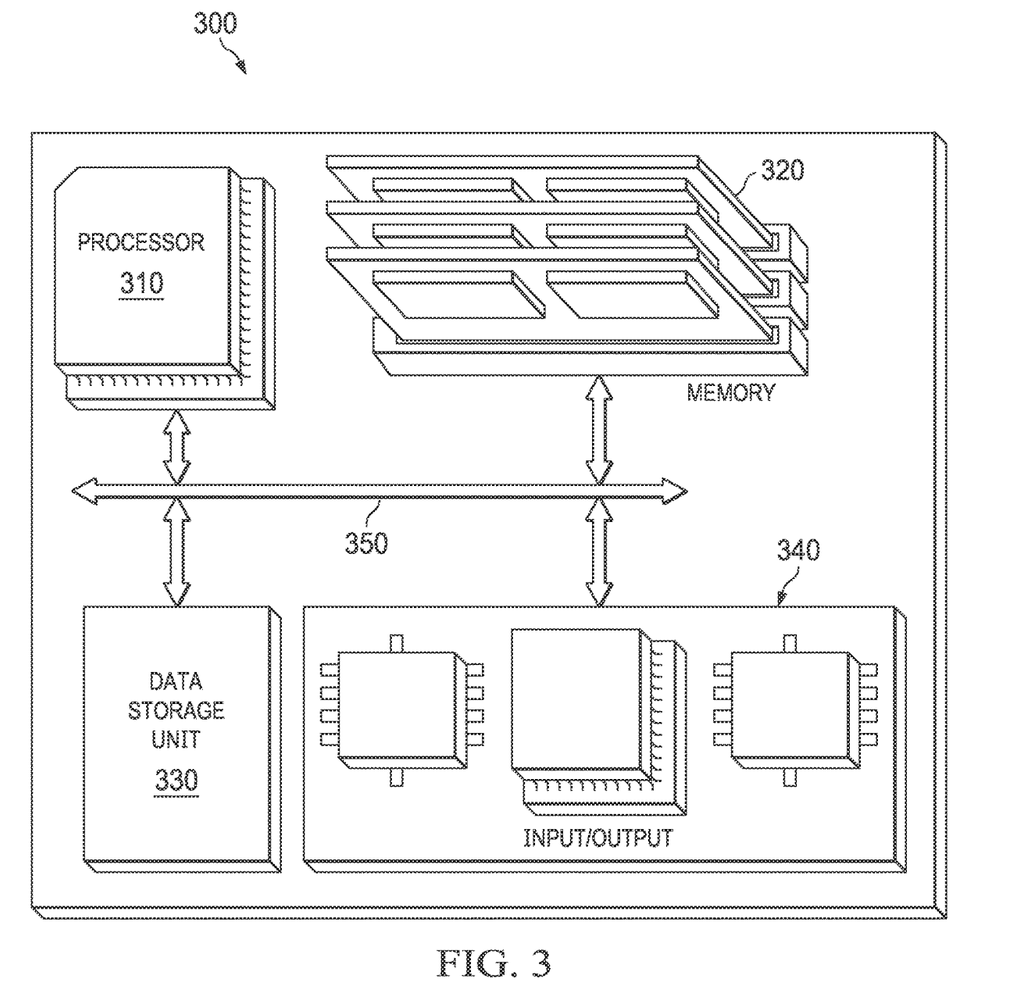
FIG. 3 illustrates a block diagram of a hardware configuration in which one or more various technologies described herein may be incorporated and practiced.

FIG. 3 illustrates a block diagram of a hardware configuration 300 in which one or more various technologies described herein may be incorporated and practiced. The hardware configuration 300 can be used to implement the one or more computing systems discussed above, including the computing system 130. The hardware configuration 300 can include a processor 310, a memory 320, a storage device 330, and an input/output device 340. Each of the components 310, 320, 330, and 340 can, for example, be interconnected using a system bus 350. The processor 310 can be capable of processing instructions for execution within the hardware configuration 300. In one implementation, the processor 310 can be a single-threaded processor. In another implementation, the processor 310 can be a multi-threaded processor. The processor 310 can be capable of processing instructions stored in the memory 320 or on the storage device 330.

The memory 320 can store information within the hardware configuration 300. In one implementation, the memory 320 can be a computer-readable medium. In one implementation, the memory 320 can be a volatile memory unit. In another implementation, the memory 320 can be a non-volatile memory unit.

In some implementations, the storage device 330 can be capable of providing mass storage for the hardware configuration 300. In one implementation, the storage device 330 can be a computer-readable medium. In various different implementations, the storage device 330 can, for example, include a hard disk device/drive, an optical disk device, flash memory or some other large capacity storage device. In other implementations, the storage device 330 can be a device external to the hardware configuration 300. Various implementations for the memory 320 and/or the storage device 330 are further discussed below.

The input/output device 340 can provide input/output operations for the hardware configuration 300. In one implementation, the input/output device 340 can include one or more display system interfaces, sensors and/or data transfer ports.

The subject matter of this disclosure, and/or components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine, e.g., a machine programmed to perform the processes described herein. The processes and logic flows can also be performed by, and apparatus can also be implemented as, special purpose logic circuitry, e.g., an FPGA (field programmable gate array) or an ASIC (application specific integrated circuit).

Computer readable media (e.g., memory 320 and/or the storage device 330) suitable for storing computer program instructions and data may include all forms of non-volatile memory, media, and memory devices, including, by way of example, any semiconductor memory devices (e.g., EPROM, EEPROM, solid state memory devices, and flash memory devices); any magnetic disks (e.g., internal hard disks or removable disks); any magneto optical disks; and any CD-ROM and DVD-ROM disks. The processor and the memory can be supplemented by, or incorporated in, special purpose logic circuitry.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method, comprising:

acquiring gyroscopic data using one or more gyroscopic sensors of a gyro-while-drilling (GWD) survey tool while the GWD survey tool is disposed at a first position within a wellbore, wherein the GWD survey tool is part of a drill string disposed within the wellbore;

acquiring first magnetic data using a magnetometer of the GWD survey tool while the GWD survey tool is disposed at the first position;

determining an offset value for the magnetometer based on the gyroscopic data and the first magnetic data;

acquiring second magnetic data using the magnetometer while the drill string performs a drilling operation within the wellbore, wherein the GWD survey tool traverses to one or more second positions within the wellbore during the drilling operation;

determining one or more magnetic azimuth values for the GWD survey tool during the drilling operation using the second magnetic data, the offset value, one or more inclination values, a total magnetic field value, and a magnetic dip angle value; and performing one or more survey operations with respect to the wellbore during the drilling operation based on the one or more magnetic azimuth values.

2. The method of claim 1, wherein acquiring the gyroscopic data comprises acquiring the gyroscopic data during a gyrocompassing survey by the GWD survey tool disposed at the first position.

3. The method of claim 1, wherein the one or more second positions are located downhole from the first position within the wellbore.

4. The method of claim 1, wherein the gyroscopic data comprises data indicative of measurements of the Earth's rotation rate with respect to an x-axis, a y-axis, and a z-axis of the GWD survey tool, wherein the z-axis corresponds to a longitudinal axis of the GWD survey tool, and wherein the x-axis and the y-axis are substantially perpendicular to the z-axis.

5. The method of claim 1, wherein:
the first magnetic data comprises data indicative of a component of the Earth's magnetic field with respect to a z-axis of the GWD survey tool while the GWD survey tool is disposed at the first position; and
the second magnetic data comprises data indicative of the component of the Earth's magnetic field with respect to the z-axis of the GWD survey tool while the GWD survey tool is disposed at the one or more second positions.

6. The method of claim 1, wherein the offset value corresponds to one or more causes of errors in measurements provided by the magnetometer, and wherein the one or more causes of errors comprise:
one or more biases of the magnetometer, magnetic interference experienced by the magnetometer, or combinations thereof.

7. The method of claim 1, wherein performing the one or more survey operations comprises transmitting the one or more magnetic azimuth values to a computing system in real-time or near real-time, wherein the computing system is configured to generate a survey of the wellbore based on the one or more magnetic azimuth values.

8. The method of claim 1, wherein performing the one or more survey operations comprises:
receiving a magnetic declination value for the GWD survey tool;
determining one or more true azimuth values based on the one or more magnetic azimuth values and the magnetic declination value; and
transmitting the one or more true azimuth values to a computing system in real-time or near real-time, wherein the computing system is configured to generate a survey of the wellbore based on the one or more true azimuth values.

9. The method of claim 1, wherein determining the offset value comprises:
acquiring gravitational data using one or more accelerometers of the GWD survey tool while the GWD survey tool is disposed at the first position; and
determining the offset value for the magnetometer based on the gyroscopic data, the gravitational data, and the first magnetic data.

10. The method of claim 9, wherein determining the offset value further comprises:
determining a true azimuth value for the GWD survey tool disposed at the first position based on the gyroscopic data and the gravitational data; and
determining a first magnetic azimuth value for the GWD survey tool disposed at the first position based on the true azimuth value.

11. The method of claim 10, wherein determining the first magnetic azimuth comprises:
receiving a magnetic declination value for the GWD survey tool; and
determining the first magnetic azimuth value for the GWD survey tool disposed at the first position based on the true azimuth value and the magnetic declination value.

12. The method of claim 10, wherein determining the offset value further comprises:
determining a first inclination value for the GWD survey tool disposed at the first position based on the gravitational data;
receiving the total magnetic field value and the magnetic dip angle value for the GWD survey tool; and
determining the offset value based on the total magnetic field value, the magnetic dip angle value, the first magnetic azimuth value, the first inclination value, and the first magnetic data.

13. The method of claim 1, further comprising:
acquiring gravitational data using one or more accelerometers of the GWD survey tool while the GWD survey tool is disposed at the one or more second positions;
determining the one or more inclination values based on the gravitational data; and
receiving the total magnetic field value and the magnetic dip angle value for the GWD survey tool.

14. The method of claim 1, wherein the one or more magnetic azimuth values comprises a respective magnetic azimuth value for the GWD survey tool for each second position of the GWD survey tool within the wellbore.

15. The method of claim 1, further comprising determining one or more additional offset values for one or more additional magnetometers of the GWD survey tool.

16. A method, comprising:
receiving gyroscopic data acquired using one or more gyroscopic sensors of a gyro-while-drilling (GWD) survey tool while the GWD survey tool is disposed at a first position within a wellbore, wherein the GWD survey tool is part of a drill string disposed within the wellbore;
receiving first magnetic data acquired using a magnetometer of the GWD survey tool while the GWD survey tool is disposed at the first position;

determining an offset value for the magnetometer based on the gyroscopic data and the first magnetic data;

receiving second magnetic data acquired using the magnetometer while the drill string performs a drilling operation within the wellbore, wherein the GWD survey tool traverses to one or more second positions within the wellbore during the drilling operation;

determining one or more magnetic azimuth values for the GWD survey tool during the drilling operation using the second magnetic data, the offset value, one or more inclination values, a total magnetic field value, and a magnetic dip angle value; and performing one or more survey operations with respect to the wellbore during the drilling operation based on the one or more magnetic azimuth values.

17. The method of claim 16, wherein the one or more second positions are located downhole from the first position within the wellbore.

18. The method of claim 16, wherein performing the one or more survey operations comprises transmitting the one or more magnetic azimuth values to a computing system in real-time or near real-time, wherein the computing system is configured to generate a survey of the wellbore based on the one or more magnetic azimuth values.

19. A system, comprising:
a gyro-while-drilling (GWD) survey tool of a drill string disposed within a wellbore, comprising:
one or more gyroscopic sensors configured to acquire gyroscopic data while the GWD survey tool is disposed at a first position within the wellbore; and
a magnetometer configured to:
acquire first magnetic data while the GWD survey tool is disposed at the first position; and
acquire second magnetic data while the drill string performs a drilling operation within the wellbore, wherein the GWD survey tool traverses to one or more second positions within the wellbore during the drilling operation; and a computing system, comprising:
a processor; and
a memory comprising a plurality of program instructions which, when executed by the processor, cause the processor to:
determine an offset value for the magnetometer based on the gyroscopic data and the first magnetic data;
determine one or more magnetic azimuth values for the GWD survey tool during the drilling operation using the second magnetic data, the offset value, one or more inclination values, a total magnetic field value, and a magnetic dip angle value; and
perform one or more survey operations with respect to the wellbore during the drilling operation based on the one or more magnetic azimuth values.

20. The system of claim 19, wherein the plurality of program instructions which, when executed by the processor, further cause the processor to:
receive gravitational data corresponding to the GWD survey tool while the GWD survey tool is disposed at the one or more second positions;
determine the one or more inclination values based on the gravitational data; and
receive the total magnetic field value and the magnetic dip angle value for the GWD survey tool.

* * * * *